May 12, 1970 — R. L. GOWER — 3,511,527
HEAD FOR WELDLESS CONNECTORS
Filed June 5, 1967

INVENTOR.
ROGER L. GOWER
BY
ATTORNEY.

United States Patent Office 3,511,527
Patented May 12, 1970

3,511,527
HEAD FOR WELDLESS CONNECTORS
Roger L. Gower, P.O. Box 65, Canaan, Maine 04924
Filed June 5, 1967, Ser. No. 643,446
Int. Cl. B64d *17/38;* B66c *1/34;* F16q *13/06*
U.S. Cl. 294—82                                4 Claims

ABSTRACT OF THE DISCLOSURE

This invention relates to a head for weldless connector means for chain and cable assemblies, by means of which chains or the like may be easily and rapidly joined together, with limited possibility of accidental disengagement.

---

It is the purpose of this invention to provide a head at the terminus of a connector device which may be easily inserted through a link of chain and which in normal use will not become disengaged, but which may be easily withdrawn upon proper manipulation thereof in relation to the link or loop through which it is inserted.

It is a further purpose of this invention to permit assembly and disassembly of chains and fittings as required for specific uses, such as single or double slings, log or binding chains, railroad, rafting and tow chains, and the like, by the use of chain of a desired size and tensile strength in combination with fittings of a required size and configuration, said fittings being attachable and detachable by the use of the special type of connector device head of the present invention.

In the drawings, in which similar numerals designate like parts throughout,

Figure 1:
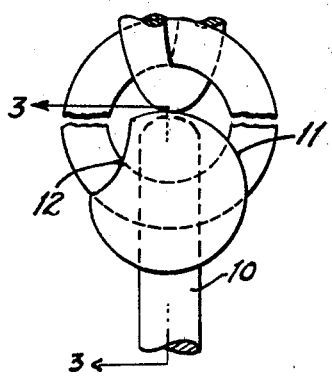
FIG. 1 shows a plan view of the head of a connector device formed as a circle and having on intersecting arc defining a cut-out portion thereof.

Referring to the drawings and particularly to FIG. 1, the shank 10 of a connector device is shown terminating in head 11, which is substantially circular with a cut-out defined by an intersecting arc 12.

Figure 2:
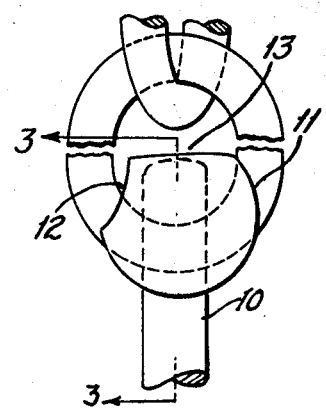
FIG. 2 shows a plan view of the head of a connector device formed as a circle modified by a chord or secant and having an intersecting arc defining a cut-out portion thereof.
Figure 1A:
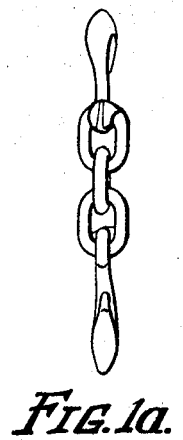
FIG. 1a shows the connector of FIGS. 1 and 2 connected to a chain assembly.

FIG. 2 shows the head 11 of the connector device with a chord or secant 13 directly adjacent the end of the shank 10, and cut-out defined by intersecting arc 12.

Figure 3:
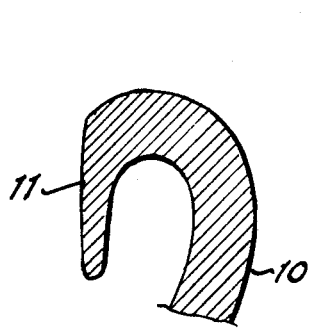
FIG. 3 shows a cross-section of either FIG. 1 or FIG. 2 on line 3—3 thereof.

FIG. 3, being a side view of the shank and head of a connector device in accordance with the present invention, shows shank 10 with head 11 flattened at the terminus thereof.

Figures 4, 5:
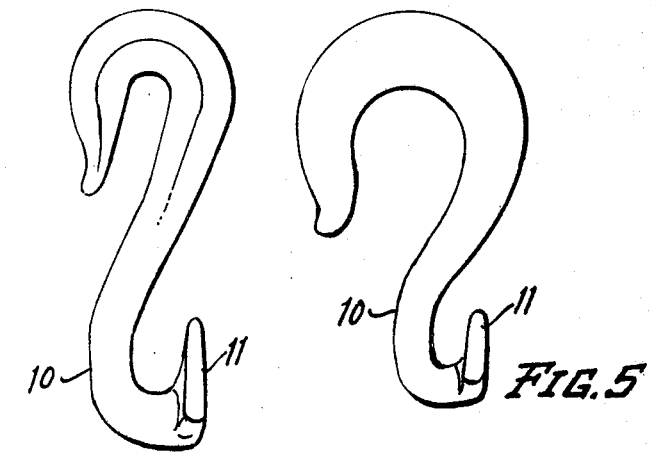
FIG. 4 shows a side elevation of a slip hook of conventional design having a weldless connector in accordance with the present invention integral therewith.
FIG. 5 shows a side elevation of a grab hook of conventional design instead of the slip hook of FIG. 4.
Figure 6:
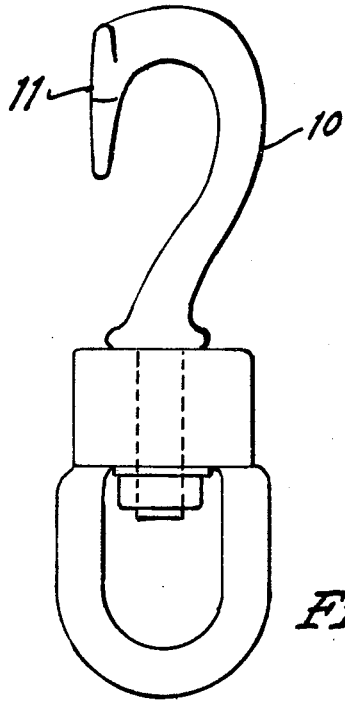
FIG. 6 shows in side elevation a swivel of conventional design having connector means in accordance with the present invention at one end thereof.

In FIGS. 4, 5 and 6 the connector head of the present invention with shank 10 and head 11 is shown as attached to conventional fittings, being a slip hook, a grab hook and a swivel, respectively.

Figure 7:
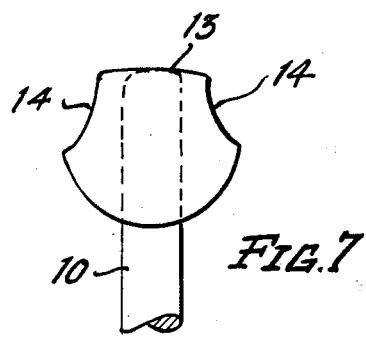
FIG. 7 shows the connector head of the present invention with dual arcs.

FIG. 7 shows a connector head similar to that of FIGS. 1 and 2, but having dual arcs 14, 14 to the right and left of the secant 13.

The purpose of the cut-out defined by arc 12 is to permit passage of the head past the link or links adjacent the link through which the device of the present invention is to be inserted. The arc carries a radius sufficient to accommodate a limited range of sizes of chain, which sizes of chain are measured by the length and width of the link and the diameter of the bar stock. While the location of the cut-out, where a single arc is employed, is not mandatorily on the left side of the shank as one faces the head, it has been found convenient to place it in that location, because in this way it can be more easily inserted and disengaged by a right-handed person, and these latter constitute the majority.

Although the single-arc connector head provides greater protection against accidental disengagement, there are uses for the dual-arc head, shown in FIG. 7, where handling time, or clearance between adjacent links, may require more facile passage than is permitted by the cutout of the single arc.

There is a strong economic advantage in products where parts may be assembled into various combinations, as need requires, instead of single-purpose assemblies each having its components permanently connected together. Thus a user whose requirements vary from one job to the next may provide himself with pieces of chain of various lengths, and fittings of various types, and assemble the unit needed for a particular task, with subsequent disassembly of the unit and the use of different fittings with that chain, or a longer or shorter chain with some of the same fittings. In all such assemblies, it is of utmost importance that they be made secure against inadvertent or accidental disengagement, and the head of the present invention is designed for, and in fact operates to provide, rapid insertion into a chain link, with removal easily effected by proper and skillful manipulation of the connector head with relation to the said link.

It is to be understood that the form of the invention as shown and described herein may be taken as a preferred example of the same, and that modifications may be made without departing from the spirit of the invention.

What I claim as my invention and desire to secure by Letters Patent of the United States, is:

1. Detachable connector means for rapid assembly thereof to chain and cable assemblies, said means comprising a flattened, flared head connected to and integral with a shank, said head being concave for a portion of the periphery thereof and being otherwise substantially circular except for a secant on the periphery thereof adjacent the shank.

2. Detachable connector means for rapid assembly thereof to chain and cable assemblies, said means comprising a shank, a flattened, flared head integrally connected to said shank in a plane perpendicular to the plane of said shank, said head being concave for a portion of the periphery thereof and being, except for said concave portion, substantially circular in said plane.

3. Connector means as claimed in claim 1, having the radius of the said concave portion sufficient to accommodate the mating arc formed by the end of a link adjacent the link through which the said connector means is inserted or withdrawn.

4. Connector means as claimed in claim 2, having the radius of the said concave portion sufficient to accommodate the mating arc formed by the end of a link adjacent the link through which the said connector means is inserted or withdrawn.

References Cited

UNITED STATES PATENTS 1,060,744  5/1913  Covert _____ 59—85

HARVEY C. HORNSBY, Primary Examiner

U.S. Cl. X.R.
54—53; 59—85, 93